United States Patent
Keite-Telgenbüscher et al.

(10) Patent No.: US 7,820,950 B2
(45) Date of Patent: Oct. 26, 2010

(54) INTRINSICALLY HEATABLE PRESSURE-SENSITIVE ADHESIVE PLANAR STRUCTURES

(75) Inventors: Klaus Keite-Telgenbüscher, Hamburg (DE); Stephan Zöllner, Buchholz/Nordheide (DE); Marco Kupsky, Kummerfeld (DE); German Patino, Hamburg (DE); Olaf Görbig, Hamburg (DE)

(73) Assignee: tesa SE, Hamburg (DE)

( * ) Notice: Subject to any disclaimer, the term of this patent is extended or adjusted under 35 U.S.C. 154(b) by 981 days.

(21) Appl. No.: 10/547,512

(22) PCT Filed: Feb. 18, 2004

(86) PCT No.: PCT/EP2004/001537

§ 371 (c)(1),
(2), (4) Date: Sep. 19, 2006

(87) PCT Pub. No.: WO2004/081136

PCT Pub. Date: Sep. 23, 2004

(65) Prior Publication Data

US 2007/0029309 A1    Feb. 8, 2007

(30) Foreign Application Priority Data

Mar. 10, 2003    (DE) ................ 103 10 722

(51) Int. Cl.
*H05B 3/10*   (2006.01)
*B29C 65/00*   (2006.01)

(52) U.S. Cl. .............. 219/553; 219/549; 219/634; 219/759; 156/272.2; 156/272.4; 156/273.3; 156/273.5; 156/275.1; 526/320; 526/328; 526/328.5; 428/473.5; 428/475.8; 428/476.3; 428/483; 264/432; 264/489

(58) Field of Classification Search .............. 156/272.2, 156/272.4, 273.3, 273.5, 275.2, 275.1, 344; 219/549, 634, 759; 526/320, 328, 328.5; 428/473.5, 475.8, 476.3, 483; 264/432, 489

See application file for complete search history.

(56) References Cited

U.S. PATENT DOCUMENTS 4,775,778 A    10/1988    van Konynenbaum et al.

(Continued)

FOREIGN PATENT DOCUMENTS

DE    29 48 350 A1    6/1980

(Continued)

OTHER PUBLICATIONS

Dontas Satas; Handbook of {Pressure Sensitive Adhesive Technology; Third Edition; Satas & Associates; Warwick, Rhode Island (1989).

(Continued)

*Primary Examiner*—Shawntina Fuqua
(74) *Attorney, Agent, or Firm*—Morris McLaughlin & Marcus, P.A.

(57) ABSTRACT

The invention relates to a pressure-sensitive supporting material, which can be (intrinsically) heated by an inner heat source, and to the use thereof. The heatable supporting material is characterized in that the supporting material comprises a pressure-sensitive adhesive layer inside of which heat is generated. The pressure-sensitive adhesive layer is a pressure-sensitive adhesive compound, which can be heated by electric current, induction, a chemical reaction or by a physical phase transition. The heatable supporting material has a high heating capacity and is suited for producing pressure-sensitive tapes for adhering heatable mirrors.

25 Claims, 6 Drawing Sheets

U.S. PATENT DOCUMENTS

| | | | | |
|---|---|---|---|---|
| 4,980,541 A | * | 12/1990 | Shafe et al. | 219/548 |
| 5,864,280 A | * | 1/1999 | Hall | 338/22 R |
| 6,228,965 B1 | * | 5/2001 | Muta et al. | 526/328.5 |
| 7,147,742 B2 | * | 12/2006 | Kirsten | 156/272.2 |

FOREIGN PATENT DOCUMENTS

| | | |
|---|---|---|
| DE | 199 12 628 A1 | 1/2000 |
| DE | 198 53 805 A1 | 5/2000 |
| DE | 199 54 960 A1 | 6/2000 |
| DE | 199 01 140 A1 | 8/2000 |
| DE | 100 14 563 A1 | 10/2001 |
| EP | 0307 205 A2 | 3/1989 |
| EP | 0 311 142 A2 | 4/1989 |
| EP | 0 512 703 A1 | 11/1992 |
| EP | 0 789 720 B1 | 8/1997 |
| EP | 0 942 059 A1 | 9/1999 |
| EP | 0 942 060 A1 | 9/1999 |
| EP | 1 073 697 B1 | 2/2001 |
| WO | WO 90/03651 | 4/1990 |
| WO | WO 97/12378 | 4/1997 |
| WO | WO 02/12409 A1 | 2/2002 |
| WO | WO 02/13580 A1 | 2/2002 |

OTHER PUBLICATIONS

T. G. Fox, "Influence of Diluent and of Copolymer Composition on the Glass Temperature of a Polymer System"; Bull Am. Phys. Soc. 1 (1956) p. 123.

Skelhorne, "Electron Beam Processing"; Chemistry and Technology of UV and EB Formulation for Coatings, Inks and Paints; vol. 1 Sita, London (1991); pp. 103-157.

Houben Weyl, Methoden der Organischen Chemi, vol. E 19a, Dr. Jürgen O. Metzger; pp. 60-147.

Eiji Ihara et al; "Living Polymerizations and Copolymerizations of Alkyl Acrylates by the Unique Catalysis of Rare Earth Metal Complexes"; Macromolecules 1995; vol. 28, pp. 7886-7892.

International Search Report.

German Search Report.

* cited by examiner

INTRINSICALLY HEATABLE PRESSURE-SENSITIVE ADHESIVE PLANAR STRUCTURES

This application is a 371 of PCT/EP2004/001537, filed Feb. 18, 2004, which claims foreign priority benefit under 35 U.S.C. §119 of the German Patent Application No. 103 10 722.3 filed Mar. 10, 2003.

The invention relates to pressure-sensitive adhesive planar structures and to their use.

Within the automobile industry the use of electrically heatable exterior mirrors is on the increase. Heated seats as well are more and more widespread. In order to achieve the desired heating in such applications, in the simplest case resistor wires are laid in a planar fashion. In this case the heat output is constant and is controlled via an external mechanism. In recent years the use of what are called PTC elements (PTC for "positive temperature coefficient") has become established. For instance, for exterior auto mirrors, PTC elements contacted with aluminum, for example, are adhesively bonded. As a result of a defined current strength being applied the PTC element heats up and the heat is transferred via a double-sided pressure-sensitive adhesive tape to the glass surface of the mirror. The PTC effect limits the temperature attained, since with increasing temperature there is a rise in the resistance of the heating element and hence a reduction in current flow. In this way it is possible to obtain temperatures of 45 to 80° C. on the surface. PTC materials used are generally thermoplastics which are generally filled with carbon black and are often partially crystalline, examples being polyvinylidene fluoride, hexafluoropropylene or tetrafluoroethylene. The state of the art is described in detail in DE 29 48 350 A1, EP 0 307 205 A1, EP 0 512 703 A1, and EP 0 852 801 A1. In the mirror heating utility, these PTC materials are printed in the form of an ink onto a network of conductor tracks which serve for contacting. The solvent contained in the ink is dried off. Inks of this kind are described in detail in EP 0 435 923 A1.

Besides a very high thermal conductivity, particular requirements are also imposed on the pressure-sensitive adhesive tape—which transports the heat from the PTC element to the mirror's surface—in respect of thermal shear strength at elevated temperatures, weathering stability, and adhesive tack at low temperatures.

The existing concept functions well but requires a relatively complicated construction, since the PTC elements must be bonded not only to the glass of the mirror but also to the support plate of the mirror, which in many cases consists of the plastic acrylonitrile/butadiene/styrene (ABS). The bonding of these different materials likewise places particular requirements on the pressure-sensitive adhesive (PSA) tape.

To simplify the operation of manufacturing heatable mirrors, therefore, there is a need for a heatable pressure-sensitive adhesive tape which bonds the support plate to the mirror and can also be heated by means for example of electrical current or of another physical or chemical mechanism.

This object is achieved, surprisingly and in a way unforeseeable for the skilled worker, by means of a planar structure comprising at least one pressure-sensitive adhesive layer within which heat is generated, as set out in independent claim 1.

The subclaims relate to preferred developments of this planar structure and its use.

Preferably the heat is induced within the pressure-sensitive adhesive layer by electrical resistance and/or induction, using a high-frequency alternating field. However, chemical reactions or physical phase transformation (e.g., crystallization) can also be used with advantage in the sense of the invention.

In accordance with the invention it is possible for such planar structures to be used singly or multiply, and the heat generation process may also be implementable singly or reproducibly.

In one simple embodiment the planar structure is composed of a singular ply of a heat-generating pressure-sensitive adhesive which joins, for example mirror and support plate. The contacting means necessary for electrical resistance heating is then accommodated in a separate element, which may also be the mirror or the mirror support plate. The same applies in the case of a coil, which is needed for induction.

In a second, preferred embodiment, contacting means or coil are an integral constituent of the adhesive tape.

Pressure-Sensitive Adhesives

An important constituent of the inventive pressure-sensitive adhesive tape is the heatable pressure-sensitive adhesive (PSA).

It is possible with advantage to use PSAs of a kind which comprise
(a) at least one adhesive component and
(b) at least one electrically conductive filler material.

In the case of a PSA which is, consequently, electrically heatable an advantageous feature is the addition of at least one electrically conductive filler material which develops heat when acted on by current. In one preferred embodiment, graphites or carbon blacks can be used. In one further-preferred version this filler is nanoscale: that is, it possesses in at least one spatial dimension an extent of not more than 500 nm, preferably not more than 200 nm, more preferably not more than 50 nm. In one very preferred embodiment conductive carbon black (for example, Printex® XE from Degussa) is used. The extent of the effect of the electrical heatability of the PSA can be determined by the degree of filling, in other words the mass fraction of the filler material in the PSA. The degree of filling is advantageously between 2% and 20% by weight. It is very preferred to use between 5% and 12% by weight of filler material.

The conductivity and hence also the attainable temperature and heating rate is dependent on the degree of filling. By raising the degree of filling it is possible to achieve higher conductivities and also hence also higher temperatures. Moreover, the electrical conductivity and hence the heatability of the PSA is also dependent on the base polymer of the adhesive component. Surprisingly it has been found that through an appropriate selection of filler, filler fraction, and adhesive component it is also possible to achieve the PTC effect.

In the case of the inductively heatable PSA it is necessary to add at least one ferromagnetic or ferrimagnetic or superparamagnetic or piezoelectric filler material, which when acted on by an electrical or magnetic alternating field develops heat. Accordingly one preferred embodiment of the planar structure is provided with PSAs of a kind which comprise
(a) at least one adhesive component and
(b) at least one ferromagnetic, ferrimagnetic, superparamagnetic or piezoelectric filler material.

Where electrical alternating fields are employed, suitable filler materials include all piezoelectric compounds, examples being quartz, tourmaline, barium titanate, lithium sulfate, potassium tartrate, sodium tartrate, potassium sodium tartrate, ethylenediamine tartrate, ferroelectrics with perovskite structure, and especially lead zirconium titanate. For the application of magnetic alternating fields suitability is possessed in particular by the metals aluminum, cobalt, iron, and nickel or their alloys, and also metal oxides of the type n-maghemite ($\gamma$-$Fe_2O_3$), n-magnetite ($Fe_3O_4$), and ferrites of the general formula MeFe$_2$O$_4$, where Me stands for divalent metals from the group manganese, copper, zinc, cobalt, nickel, magnesium, calcium or cadmium. With particular preference the superparamagnetic particles are of nanoscale size, referred to as "single-domain particles", since in this case a particularly effective heating rate can be achieved (cf. WO 02/12409 A1).

The extent of the effect of the inductive heatability of the PSA can be determined by the degree of filling, in other words the mass fraction of the filler material in the PSA. The degree of filling should be between 1% and 30% by weight. One preferred version uses between 2% and 20% by weight of filler material. The achievable temperature and the heating rate is dependent on the degree of filling. By raising the degree of filling it is possible to attain higher temperatures. A temperature limitation similar to the PTC effect is provided by the Curie temperature of the filler material. At this temperature the material loses its ferro-, ferri- or paramagnetic properties, so ruling out further heating by induction.

With very great advantage the inductive filler material—in accordance with that in connection with the remarks for the electrical filler material—has in at least one spatial direction an extent of not more than 500 nm, preferably not more than 200 nm, more preferably not more than 50 nm.

A further improvement to the support material can be achieved by adding at least one filler having a high heat capacity, in particular having a heat capacity of more than 0.7 J/gK. As a result of the buffer function, this leads to an evening-out of the heating behavior and to a prolonged emission of heat after the end of the active heat generation process. Examples of fillers with a high heat capacity include aluminum, beryllium, boron, calcium, iron, graphite, potassium, copper, magnesium, phosphorus or compounds of the aforementioned substances, especially aluminum oxide and aluminum chloride, calcium carbonate, calcium chloride, copper sulfate, magnetite, hematite, magnesium carbonate, magnesium chloride, phosphorus chloride, and phosphorus oxide.

As the adhesive component of the electrically heatable pressure-sensitive adhesives it is possible to use all pressure-sensitive adhesives having suitable pressure-sensitive adhesion properties. The monomers which serve for preparing the adhesive component are selected in particular such that the resulting polymers can be used as pressure-sensitive adhesives at room temperature or higher temperatures, preferably such that the resulting polymers possess pressure-sensitive adhesion properties in accordance with the "Handbook of Pressure Sensitive Adhesive Technology" by Donatas Satas (van Nostrand, New York 1989).

In order to obtain a glass transition temperature, T$_g$, of the polymers which is preferred for pressure-sensitive adhesives, of T$_g \leq 25°$ C., and in accordance with what has been said above, the monomers are very preferably selected such, and the quantitative composition of the monomer mixture advantageously chosen such, that in accordance with the Fox equation (E1) (cf. T. G. Fox, Bull. Am. Phys. Soc.1 (1956) 123) the desired T$_g$ value for the polymer is produced.

$$\frac{1}{T_g} = \sum_n \frac{w_n}{T_{g,n}} \quad (E1)$$

In this equation, n represents the serial number of the monomers used, W$_n$ the mass fraction of the respective monomer n (% by weight), and T$_{g,n}$ the respective glass transition temperature of the homopolymer of each of the monomers n, in K.

With advantage in accordance with the invention it is possible as the adhesive component to use PSAs based on acrylic acid and/or methacrylic acid and/or based on esters of the aforementioned compounds.

Particular suitability as the adhesive component is possessed by acrylate pressure-sensitive adhesives, which are obtainable, for instance, by means of free-radical addition polymerization and which are based at least partly on at least one acrylic monomer of the general formula (1)

(1)

where R$_1$ is H or a CH$_3$ radical and R$_2$ is H or is selected from the group of saturated, unbranched or branched, substituted or unsubstituted C$_1$ to C$_{30}$ alkyl radicals. The at least one acrylic monomer ought to have a mass fraction of at least 50% in the pressure-sensitive adhesive.

According to one particularly advantageous version polymers are employable as adhesive component which (a1) are based at least partly on at least one acrylic monomer of the general formula CH$_2$=C(R$_1$)(COOR$_2$), where R$_1$ is H or a CH$_3$ radical and R$_2$ is selected from the group of saturated, unbranched or branched, substituted or unsubstituted C$_2$ to C$_{20}$ alkyl radicals, and (a2) are based at least partly on a comonomer which is polymerizable with the at least one acrylic monomer and which may be selected in particular from vinyl compounds with functional groups, maleic anhydride, styrene, styrene compounds, vinyl acetate, acrylamides, and double-bond-functionalized photo-initiators.

Preferably the at least one acrylic monomer (a1) has a mass fraction of 65% to 100% by weight and the at least one comonomer (a2) has a mass fraction of 0 to 35% by weight in the adhesive component.

Furthermore, an average molecular mass M$_W$ (weight average) of the adhesive component of not more than 800 000 g/mol has proven advantageous, particularly with regard to the desired mechanical properties of the pressure-sensitive adhesive.

According to a further configuration the at least one adhesive component may also comprise natural or synthetic rubber compounds or be based on such. For adhesive components comprising natural rubber, said rubber is ground to a freely selectable molecular weight and then additized with the electrically conductive filler. In one particular version it is also possible to use partially crystalline polymers such as EVA (ethylene vinyl acetate) or polyolefins as the adhesive component or to add them to said component. The increase in volume of the crystalline phase on exceeding the crystallite melting temperature assists the PTC effect.

Very preferentially use is made of acrylic or methacrylic monomers of the general formula (1), which comprise acrylic and methacrylic esters, where the group R2 is selected from the group of saturated, unbranched or branched, substituted or unsubstituted C4 to C14 alkyl radicals, especially C4 to C9 alkyl radicals. Specific examples, without wishing to be restricted by this enumeration, are methyl acrylate, methyl methacrylate, ethyl acrylate, n-butyl butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and their branched isomers, examples being isobutyl acrylate, 2-ethylhexyl acrylate, 2-ethylhexyl methacrylate, isooctyl acrylate, and isooctyl methacrylate.

Further classes of compound to be used are monofunctional acrylates and/or methacrylates of the general formula (1) where the radical $R_2$ is selected from the group of bridged or unbridged cycloalkyl radicals having at least 6 carbon atoms. The cycloalkyl radicals may also be substituted, by $C_1$ to $C_6$ alkyl groups, halogen atoms or cyano groups, for example. Specific examples are cyclohexyl methacrylate, isobornyl acrylate, isobornyl methacrylate, and 3,5-dimethyladamantyl acrylate.

In one preferred procedure acrylic monomers and/or comonomers are used which have one or more substituents, especially polar substituents, examples being carboxyl, sulfonic acid, phosphonic acid, hydroxyl, lactam, lactone, N-substituted amide, N-substituted amine, carbamate, epoxy, thiol, alkoxy, cyano, halide, and ether groups.

Suitable with very great advantage in the sense of acrylic component (a1) are monomers selected from the following group:

substituted or unsubstituted compounds, comprising methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, isobutyl acrylate, 2-ethylhexyl acrylate, 2-ethylhexyl methacrylate, isooctyl acrylate, isooctyl methacrylate, cyclohexyl methacrylate, isobornyl acrylate, isobornyl methacrylate, and 3,5-dimethyladamantyl acrylate.

Likewise suitable are moderately basic comonomers (a2), such as singly or doubly N-alkyl-substituted amides, especially acrylamides. Specific examples here are N,N-dimethylacrylamide, N,N-dimethylmethacrylamide, N-tert-butylacrylamide, N-vinyl pyrrolidone, N-vinyllactam, dimethylaminoethyl acrylate, dimethylaminoethyl methacrylate, diethylaminoethyl acrylate, diethylaminoethyl methacrylate, N-methylolacrylamide, N-methylolmethacrylamide, N-(butoxymethyl)methacrylamide, N-(ethoxymethyl)acrylamide, and N-isopropylacrylamide, this enumeration not being exhaustive.

Further preferred examples of comonomers (a2) are hydroxyethyl acrylate, hydroxyethyl methacrylate, hydroxypropyl acrylate, hydroxypropyl methacrylate, allyl alcohol, maleic anhydride, itaconic anhydride, itaconic acid, glyceridyl methacrylate, phenoxyethyl acrylate, phenoxyethyl methacrylate, 2-butoxyethyl acrylate, 2-butoxyethyl methacrylate, cyanoethyl acrylate, cyanoethyl methacrylate, glyceryl methacrylate, 6-hydroxyhexyl methacrylate, vinylacetic acid, tetrahydrofurfuryl acrylate, β-acryloyloxypropionic acid, trichloroacrylic acid, fumaric acid, crotonic acid, aconitic acid, and dimethylacrylic acid, this enumeration not being exhaustive.

In a further very preferred procedure comonomers (a2) used are vinyl compounds, especially vinyl esters, vinyl ethers, vinyl halides, vinylidene halides, vinyl compounds with aromatic rings and heterocycles in α position. Here too mention may be made, nonexclusively, of certain examples, such as vinyl acetate, vinylformamide, vinylpyridine, ethyl vinyl ether, vinyl chloride, vinylidene chloride, styrene, and acrylonitrile.

With particular advantage the at least one comonomer (a2) can be a photoinitiator having a copolymerizable double bond, selected in particular from the group containing Norrish I or Norrish II photoinitiators, benzoin acrylates or acrylated benzophenones.

In one further preferred procedure the comonomers (a2) described are admixed with monomers which possess a high static glass transition temperature. Suitable components include aromatic vinyl compounds, such as styrene, for example, with the aromatic nuclei being composed preferably of $C_4$ to $C_{18}$ units and being able also to contain heteroatoms. Particularly preferred examples are 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, t-butylphenyl acrylate, t-butylphenyl methacrylate, 4-biphenylyl acrylate and methacrylate, 2-naphthyl acrylate and methacrylate, and mixtures of those monomers, this enumeration not being exhaustive.

In order to optimize the technical adhesive properties it is possible to admix resins to the inventive pressure-sensitive adhesives. As tackifying resins for addition it is possible without exception to use all existing tackifier resins and those described in the literature. Representatives that may be mentioned include pinene resins, indene resins, and rosins, their disproportionated, hydrogenated, polymerized, and esterified derivatives and salts, the aliphatic and aromatic hydrocarbon resins, terpene resins and terpene-phenolic resins, and also $C_5$ to $C_9$ resins and other hydrocarbon resins. Any desired combinations of these and further resins may be used in order to adjust the properties of the resultant adhesive in accordance with what is desired. Generally speaking it is possible to employ any resins which are compatible (soluble) with the corresponding polyacrylate; in particular, reference may be made to all aliphatic, aromatic and alkylaromatic hydrocarbon resins, hydrocarbon resins based on single monomers, hydrogenated hydrocarbon resins, functional hydrocarbon resins, and natural resins. Express reference may be made to the depiction of the state of the art in "Handbook of Pressure Sensitive Adhesive Technology" by Donatas Satas (van Nostrand, 1989). In one preferred version resins are used which, even over a prolonged period of time, do not reduce the electrical conductivity or the heatability.

It is advantageous if partially crystalline polymers are used as the adhesive component or are added to said component.

The PSAs used for the inventive planar structures are preferably crosslinked, the aim being for high degrees of crosslinking, which also assist the PTC effect (see EP 0 311 142 A1 or U.S. Pat. No. 4,775,778 A). According to one preferred embodiment of the invention the at least one adhesive component has a degree of crosslinking which corresponds at least to a gel index of 35%, in particular of at least 60%. In the present case the gel index is defined as the ratio of toluene-insoluble adhesive component to soluble adhesive component. In one preferred procedure the pressure-sensitive adhesives are crosslinked using electron beams. Typical irradiation equipment which can be employed includes linear cathode systems, scanner systems, and segmented cathode systems, where electron beam accelerators are concerned. A detailed description of the state of the art and the most important process parameters are found in Skelhorne, Electron Beam Processing, in Chemistry and Technology of UV and EB formulation for Coatings, Inks and Paints, Vol. 1, 1991, SITA, London. Typical acceleration voltages are situated in the range between 50 and 500 kV, preferably in the range between 80 and 300 kV. The scatter doses employed range between 5 to 150 kGy, in particular between 20 and 100 kGy. It is also possible to employ other processes which allow high-energy irradiation.

A further constituent of the invention is the variation of the electrical conductivity and hence of the thermal heating via the degree of crosslinking. By raising the EB dose (and hence also the degree of crosslinking) it is possible to increase the electrical conductivity, and for a given current the temperature of the pressure-sensitive adhesive goes up. By the degree of crosslinking it is likewise possible to adjust the PTC effect.

To reduce the required dose it is possible to admix the pressure-sensitive adhesive with crosslinkers and/or crosslinking promoters, particularly crosslinkers and/or promoters which are excitable by electron beams or thermally. Suitable crosslinkers for electron beam crosslinking are difunctional or polyfunctional acrylates or methacrylates. In a further preferred version the pressure-sensitive adhesives are crosslinked using thermally activable crosslinkers. For this purpose it is preferred to admix metal chelates, difunctional or polyfunctional epoxides, difunctional or polyfunctional hydroxides, and difunctional or polyfunctional isocyanates.

In addition it is possible optionally though advantageously to add plasticizers and/or further fillers to the pressure-sensitive adhesive.

Preparation Process for the Pressure-Sensitive Adhesives

The electrically or inductively heatable PSAs that are used for the planar structures of the invention can be prepared advantageously by a process where
(a) at least one adhesive component is prepared by means of the polymerization—which can be carried out at least partly in solution or in bulk (without solvent)—of at least one monomer, in the presence if desired of at least one comonomer, and
(b) at least one electrically conductive, ferromagnetic or ferrimagnetic filler material is combined with the adhesive component prior to polymerization with the at least one monomer and, if desired, with the at least one copolymer or is combined after the polymerization with the at least one adhesive component.

To prepare in particular the poly(meth)acrylate pressure-sensitive adhesives it is advantageous to carry out conventional free-radical polymerizations. For the polymerizations which proceed by a free-radical mechanism it is preferred to use initiator systems which additionally comprise further free-radical polymerization initiators, especially thermally decomposing free-radical-forming azo or peroxo initiators. Suitable in principle, however, are all customary initiators familiar to the skilled worker for acrylates. The production of C-centered radicals is described in Houben Weyl, Methoden der Organischen Chemie, Vol. E 19a, pp. 60-147. These methods are preferentially employed in analogy.

Examples of free-radical sources are peroxides, hydroperoxides, and azo compounds. As certain nonexclusive examples of typical free-radical initiators mention may be made here of potassium peroxodisulfate, dibenzoyl peroxide, cumene hydroperoxide, cyclo-hexanone peroxide, di-tert-butyl peroxide, azodiisobutyronitrile, cyclohexylsulfonyl acetyl peroxide, diisopropyl percarbonate, tert-butyl peroctoate, and benzpinacol. In one very preferred version the free-radical initiator used comprises 1,1'-azobis(cyclohexane-carbonitrile) (Vazo 88™ from DuPont) or azodiisobutyronitrile (AIBN).

The electrically conductive, or inductive, filler materials can be admixed to the monomers prior to the polymerization and/or after the end of the polymerization. Preferably the filler material is compounded after the polymerization to a melt of the at least one adhesive component.

The polymerization can be carried out in bulk (without solvent), in the presence of one or more organic solvents, in the presence of water, or in mixtures of organic solvents and water. The aim here is to minimize the amount of solvent used. Suitable organic solvents are pure alkanes (e.g., hexane, heptane, octane, isooctane), aromatic hydrocarbons (e.g., benzene, toluene, xylene), esters (e.g., ethyl acetate, propyl acetate, butyl acetate or hexyl acetate), halogenated hydrocarbons (e.g., chlorobenzene), alkanols (e.g., methanol, ethanol, ethylene glycol, ethylene glycol monomethyl ether), and ethers (e.g., diethyl ether, dibutyl ether) or mixtures thereof. The aqueous polymerization reactions can be admixed with a water-miscible or hydrophilic cosolvent in order to ensure that during monomer conversion the reaction mixture is in the form of a homogeneous phase. Cosolvents which can be used with advantage for the present invention are selected from the following group, consisting of aliphatic alcohols, glycols, ethers, glycol ethers, pyrrolidines, N-alkylpyrrolidinones, N-alkylpyrrolidones, polyethylene glycols, polypropylene glycols, amides, carboxylic acids and salts thereof, esters, organic sulfides, sulfoxides, sulfones, alcohol derivatives, hydroxyl ether derivatives, amino alcohols, ketones and the like, and also derivatives and mixtures thereof.

The polymerization time is between 2 and 72 hours, depending on conversion and temperature. The higher the reaction temperature that can be selected, in other words the higher the thermal stability of the reaction mixture, the lower the reaction time that can be selected.

To initiate the polymerization the introduction of heat is essential for the thermally decomposing initiators. For the thermally decomposing initiators the polymerization can be initiated by heating at 50 to 160° C., depending on initiator type.

For the preparation it may also be of advantage to polymerize the acrylate pressure-sensitive adhesives in bulk. In this case it is particularly suitable to employ the prepolymerization technique. The polymerization is initiated with UV light but taken only to a low conversion of about 10% to 30%. This polymer syrup can then be welded into films (in the simplest case, ice cubes), for example, and then polymerized through to a high conversion in water. These pellets can then be employed as acrylate hotmelt adhesives, particular preference for the melting operation being given to the use of the film materials which are compatible with the polyacrylate. For this method of preparation as well it is possible to add the electrically conductive or inductive materials before or after the polymerization.

Another advantageous preparation process for the poly (meth)acrylate pressure-sensitive adhesives is that of anionic polymerization. Here, inert solvents are used preferably as the reaction medium, such as aliphatic and cycloaliphatic hydrocarbons, for example, or else aromatic hydrocarbons.

The living polymer is represented in this case in general by the structure $P_L(A)$-Me, where Me is a metal from group 1, such as lithium, sodium or potassium, for example, and $P_L(A)$ is a growing polymer of the acrylate monomers. The molar mass of the polymer under preparation is controlled by the ratio of initiator concentration to monomer concentration. Examples of suitable polymerization initiators include n-propyllithium, n-butyllithium, sec-butyllithium, 2-naphthyllithium, cyclohexyllithium or octyllithium, this enumeration making no claim to completeness. Furthermore, initiators based on samarium complexes are known for the polymerization of acrylates (Macromolecules, 1995, 28, 7886) and can be used here.

Additionally it is possible as well to use difunctional initiators, such as 1,1,4,4-tetraphenyl-1,4-dilithiobutane or 1,1, 4,4-tetraphenyl-1,4-dilithioisobutane, for example. Coinitiators may likewise be employed. Suitable coinitiators include lithium halides, alkali metal alkoxides or alkylaluminum compounds. In one very preferred version the ligands and coinitiators are selected such that acrylate monomers, such as n-butyl acrylate and 2-ethylhexyl acrylate, for example, can be polymerized directly and need not be generated within the polymer by transesterification with the corresponding alcohol.

Polymerization methods suitable for preparing polyacrylate pressure-sensitive adhesives having a narrow molecular weight distribution also include controlled free-radical polymerization methods.

Production of Pressure-Sensitive Adhesive Tapes

One advantageous version of the invention relates to planar structures (especially in the form of electrically heatable pressure-sensitive adhesive tapes) of the kind which comprise a film of the heatable pressure-sensitive adhesive and an electrically conductive contacting means.

Advantageously suitable contacting means are metal foils, metal meshes or metal-coated polymeric films.

In one simple case the heatable pressure-sensitive adhesive is contacted with an electrically conductive metal. It is preferred to employ metals which exhibit little or no corrosion over prolonged periods of time. In very preferred versions, for example, copper or aluminum is used, although silver or gold contacting means may also be implemented. The metal can be deposited directly on the PSA, by means of electroplating or vapor deposition methods, for example, or may be laminated on in the form of a continuous or perforated layer.

Besides metal foils, however, it is also possible to use polymeric films which have a metallized surface.

BRIEF DESCRIPTION OF THE DRAWINGS

FIGS. 1 to 7 show by way of example typical product constructions of the planar structures of the invention.

FIGS. 8 and 9 are graphs depicting properties of the inventive constructs.

Figure 1:
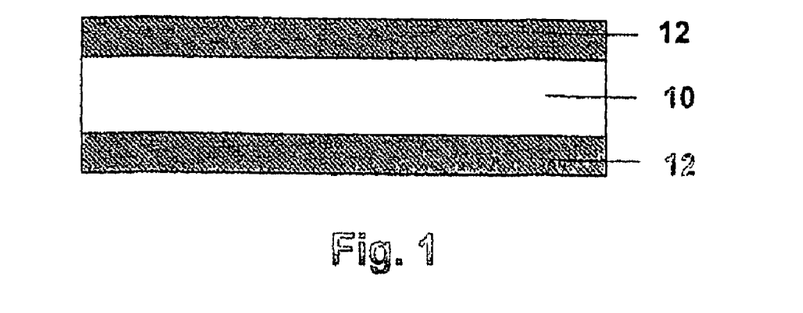
FIG. 1: Contacting via Al foil
Figure 2:
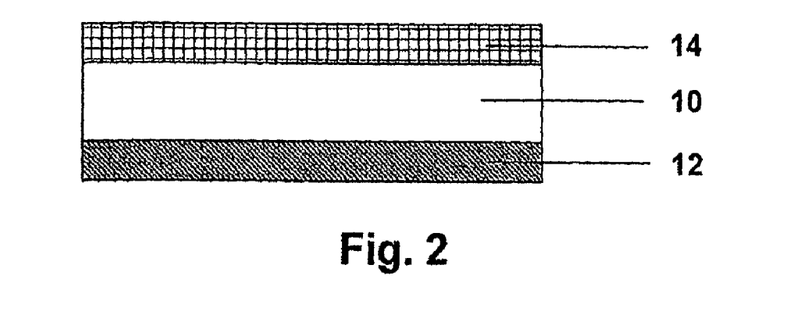
FIG. 2: Contacting via Al foil and metal mesh
Figure 3:
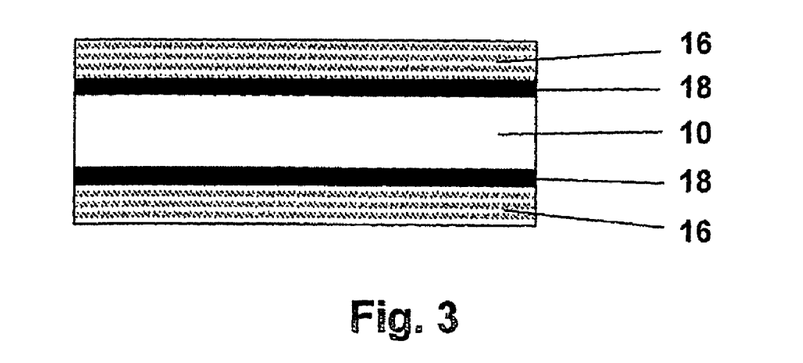
FIG. 3: Contacting via metallized film

Possible arrangements of such contacted pressure-sensitive adhesive tapes are depicted in FIGS. 1 to 5. According to FIG. 1 the electrically heatable pressure-sensitive adhesive 10 is contacted on both sides over its full area with a metal foil 12, in particular an aluminum or copper foil. According to FIG. 2 the pressure-sensitive adhesive 10 is contacted on one side, likewise over its full area, with a metal foil 12 and on the other side, over part of its area, with a metal mesh 14. FIG. 3, finally, shows a product construction in which the pressure-sensitive adhesive 10 is contacted on both sides with a metallized polymeric film, 16 referring in each case to the polymeric film and 18 to its metal coating.

Figure 4:
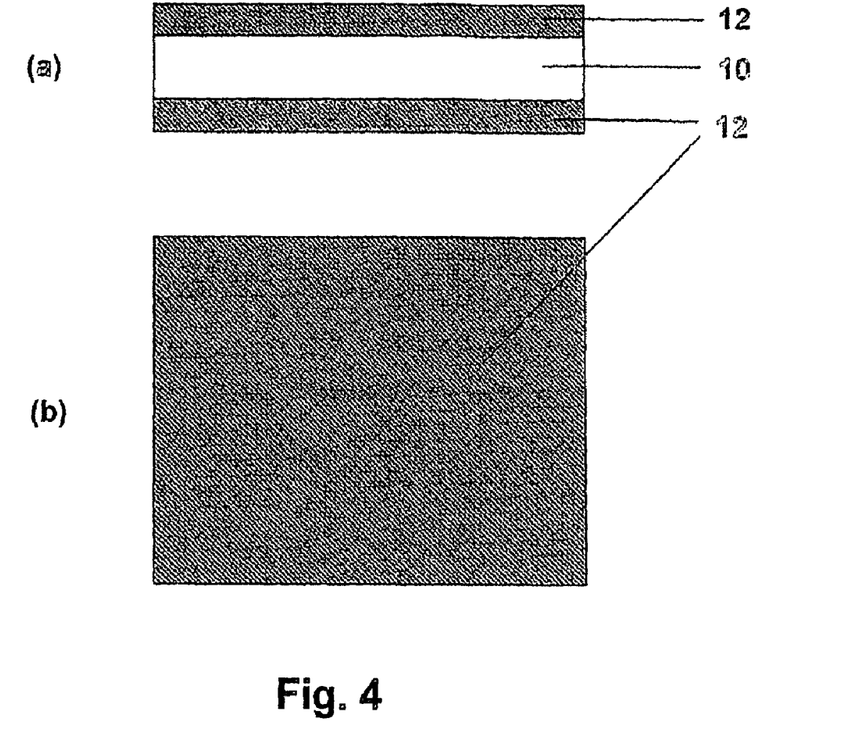
FIG. 4: PSA with whole-area contacting: (a) cross section, (b) plan view
Figure 5:
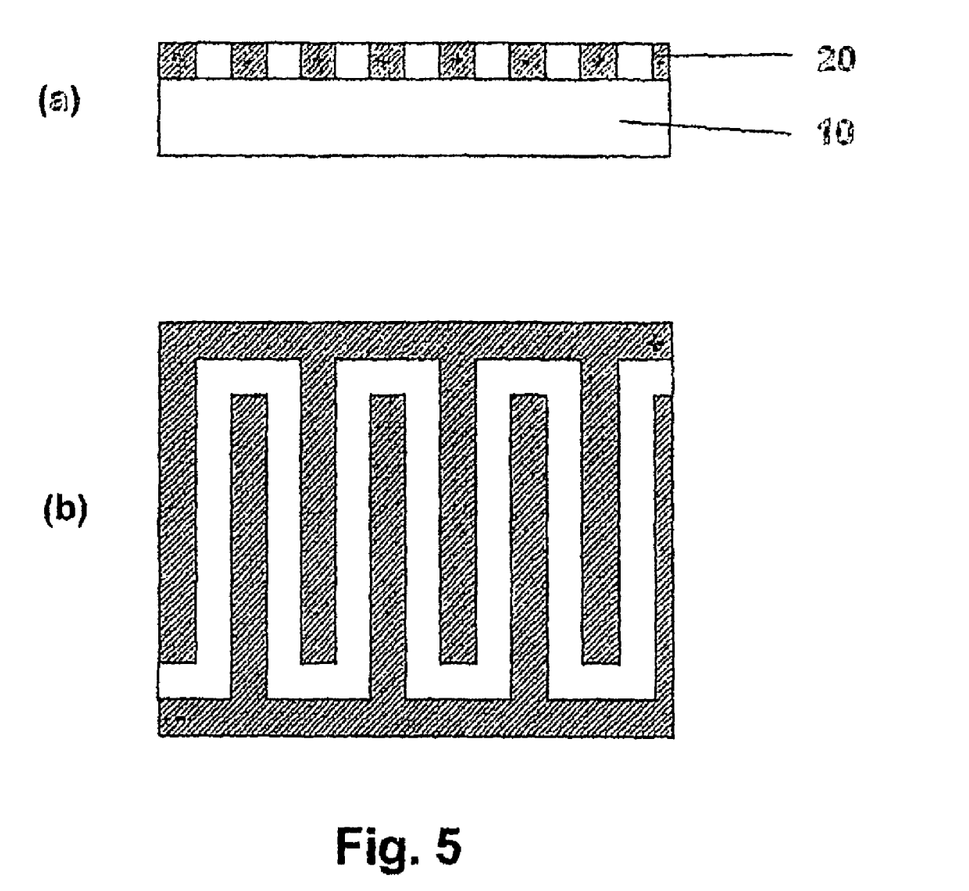
FIG. 5: Adhesive contacted on one side with a comb structure: (a) cross section, (b) plan view

The contacting means may extend on both sides over the entire area of the adhesive tape's surface or may cover the surface on one or both sides only partially, particularly in the form of lines, dots, grids, combs or other geometric shapes. In the former case the result is a flow of current transverse to the areal extent of the heatable PSA (z direction), whereas in the second case the result, exclusively or additionally, is a flow of current within the areal extent of the heatable PSA (x-y direction). FIGS. 4 and 5 illustrate such versions exemplarily and without wishing to restrict the invention unnecessarily.

Key: 10=heatable PSA, 12=metal foil, 20=electrode structure

Figure 6:
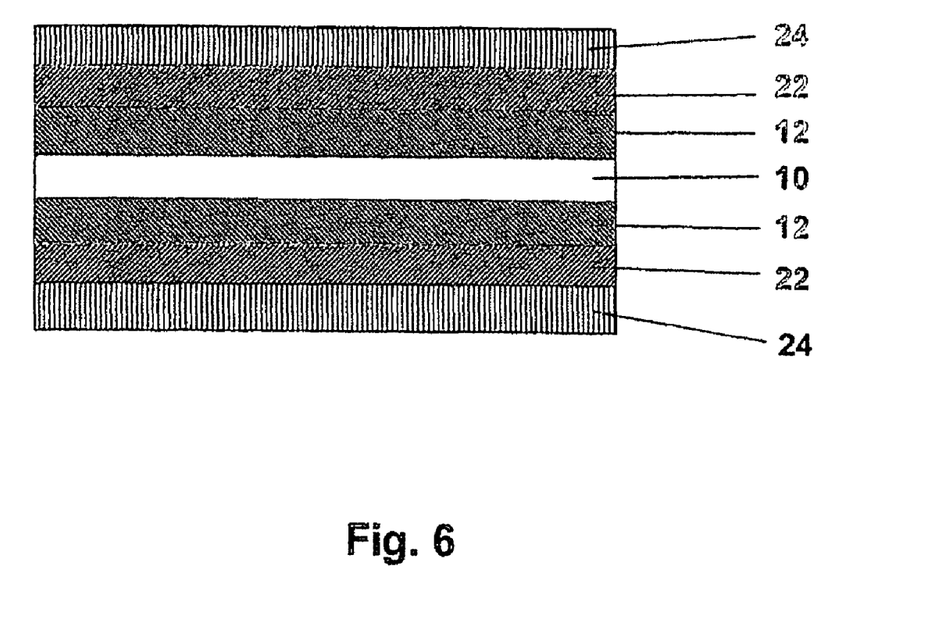
FIG. 6: Multilayer planar structure of the invention

Further advantageous product designs are realizable. One particularly advantageous construction of the support material comprises, in addition to the heatable PSA, further PSA layers and contacting layers, and also covering materials (cf. one example of such a planar structure in FIG. 6; key: 10=heatable PSA, 12=metal foil, 22=further PSA, 24=siliconized PET film).

Figure 7:
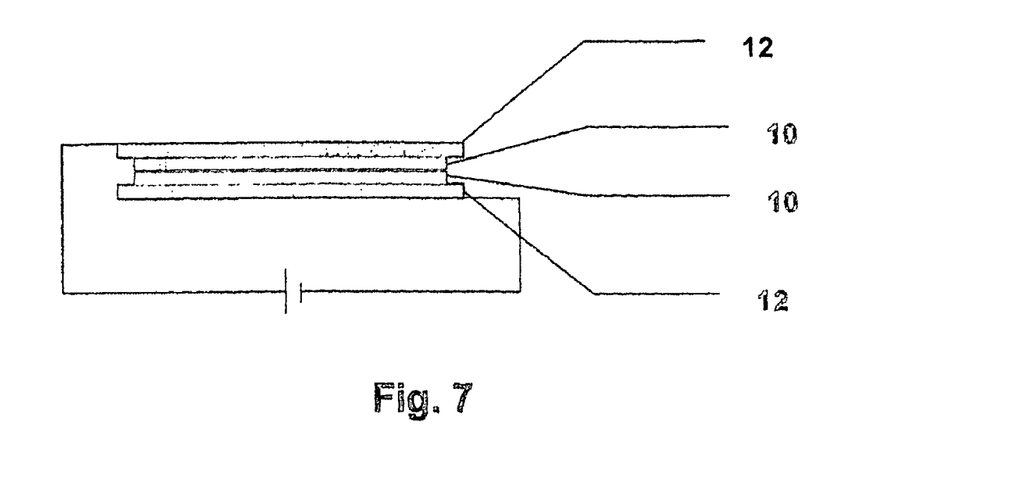
FIG. 7: Planar structure of the invention with two-ply construction of the heatable PSA and planar contacting

In one preferred embodiment the pressure-sensitive heatable layer is constructed from two or more plies of the same or similar materials. Particularly in the case of heating by electrical resistance, this prevents possible short circuits due to filler agglomerates. FIG. 7 depicts such a construction with a two-ply heatable PSA.

Key: 10=heatable PSA, 12=metal foil

In a further advantageous version the heatable planar structure is equipped with a mechanism which when the planar structure is first heated leads to an increase in the cohesion of the pressure-sensitive adhesive heatable layer and/or of a further PSA layer. This could be, for example, an increase in the crosslinking density as a result of thermally initiated postcrosslinking. A planar structure of this kind is advantageously used such that, first of all, the bond is produced to at least one substrate, the initial heating is performed, and accordingly the bond becomes solid.

For producing the planar structure of the invention it is advantageous to coat a support material with a solution or a melt (by the process known as the hotmelt process) of the heatable PSA. The support (or backing) material is preferably a release paper or polymeric film which can be peeled from the PSA. Pressure-sensitive adhesive tapes of this kind are also suitable in particular for transferring the PSA film to the abovementioned contacting means. However, the contact material itself as well, such as a metal foil or a metallized polymeric film, for example, or a support material comprising the contacting means or the induction coil or chemically active substances, can be coated.

For producing the inventive pressure-sensitive adhesive tapes it is possible to coat the pressure-sensitive adhesives from solution or, very preferably, as hotmelt systems (i.e., from the melt). For the production process it may therefore be necessary to remove the solvent from the pressure-sensitive adhesive. Here it is possible in principle to use all of the methods that are known to the skilled worker. One very preferred method is that of concentration by way of a single-screw or twin-screw extruder. The twin-screw extruder can be operated corotatingly or counterrotatingly. The solvent or water is preferably distilled off over two or more vacuum stages. Moreover, counterheating is carried out depending on the distillation temperature of the solvent. The residual solvent fractions are preferably less than 1%, more preferably less than 0.5%, and very preferably less than 0.2%.

For coating from the melt as a hotmelt system, preferably, the electrically conductive, or inductive, filler material is compounded to the melt. In this case its homogeneous incorporation in the sense of the invention is desirable. Homogeneous distributions of the filler material within the pressure-sensitive adhesive are preferably accomplished by compounding in twin-screw extruders or planetary-roll extruders. The twin-screw extruders may be operated corotatingly or counterrotatingly.

An advantage of this operation is the only very short-term contamination of the production operation with the filler material, and also the avoidance of solvents.

After compounding it is preferred to coat the hotmelt onto a backing material via a melt die or via an extrusion die or via a roll applicator mechanism.

In one very preferred version transfer tapes are produced. Examples of suitable backing material include all siliconized or fluorinated films having a release effect. As film materials mention may be made here, only by way of example, of BOPP, MOPP, PET, PVC, PU, PE, PE/EVA, EPDM, PP, and PE. It is additionally possible, for transfer tapes, to use release papers as well (glassine papers, kraft papers, polyolefinically coated papers).

The planar structure of the invention has a high level of heating performance and is suitable for use as a pressure-sensitive adhesive tape which in addition to a bonding function also fulfills a heating function, such as for the bonding of heatable mirrors.

Correspondingly the invention likewise provides for the use of the afore-described planar structures for heating substrates bonded with such planar structures, especially in the automobile industry.

In the case of one advantageous use of the planar structures of the invention, the heating of the substrate is induced by heating of the planar structure, the planar structure having been applied to at least one substrate which is equipped with at least one electrical contact or at least one means of generating an electrical or magnetic field or with at least one chemical substance which is capable of initiating an exothermic reaction within the planar structure, the substrate in particular being one of the bonded substrates itself (but not necessarily so).

The latter use is also suitable in particular for those embodiments of the planar structures of the invention in which an electrical contact or an apparatus for generating a field is not integrated into the planar structure itself.

Experiments

The invention is described below by means of experiments, without wishing to subject the invention to any unnecessary restriction as a result of the choice of samples investigated.

Test methods employed were as follows.

Determination of Average Molecular Weight (Test A)

The average molecular weight $M_w$ and the polydispersity PD of the adhesive component were determined by way of gel permeation chromatography (GPC). The eluent used was THF containing 0.1% by volume trifluoroacetic acid. Measurement was carried out at 25° C. The precolumn used was PSS-SDV, 5µ, $10^3$ Å, ID 8.0 mm×50 mm. Separation was carried out using the columns PSS-SDV, 5µ, $10^3$ and also $10^5$ and $10^6$ Å with in each case ID 8.0 mm×300 mm. The sample concentration was 4 g/l, the flow rate 1.0 ml per minute. Measurement was carried out against PMMA standards.

Measurement of Heatability (Test B)

To determine the electrical heatability of the material, a measurement was made of the temperature increase after subjection to electrical voltage. The temperature was measured using an IR thermometer. Contacting was carried out in accordance with FIG. 1 by providing (by lamination) a 50 µm film of the heatable pressure-sensitive adhesive on both sides with an Al foil measuring 25×25 mm² and with a thickness of 50 µm, and via these electrodes a voltage of 12 volts was applied using a transformer. The top side was positively charged, the bottom side negatively charged. The temperature was measured after 30 seconds directly on the surface of the pressure-sensitive adhesive and was reported in ° C.

In order to determine the PTC effect, furthermore, the temperature increase after current exposure was measured over time. The temperature was measured using an IR thermometer. For the test specimen, in accordance with FIG. 7, a 50 µm film of the heatable PSA was laminated to itself in a double ply, provided on both sides with a 50 µm Al film measuring 25×25 mm² (i.e., laminated), and, using these electrodes, a voltage of 13.8 volts was applied via a transformer. The top face had a positive charge, the bottom face a negative charge.

180° Bond Strength (Test C)

To determine the bond strength of the support materials a strip, 20 mm wide, of a pressure-sensitive adhesive coated onto polyester or siliconized release paper was applied to steel plates. Lengthwise or transverse specimens were adhered to the steel plate, in accordance with direction and stretching. The pressure-sensitive adhesive strip was pressed onto the substrate twice using a 2 kg weight. The adhesive tape was subsequently peeled immediately from the substrate at 30 mm/min and at a 180° angle. The steel plates had been washed beforehand twice with acetone and once with isopropanol. The results of the measurements are reported in N/cm and are averaged from three measurements. All measurements were carried out at room temperature under standardized conditions.

Determination of the Gel Index (Test D)

After careful drying, the solvent-free adhesive samples are welded into a polyethylene web pouch (Tyvek nonwoven). The difference in the sample weights before and after extraction with toluene gives the gel index, i.e., the toluene-insoluble weight fraction of the polymer.

Measurement of PTC Effect (Test E)

The pressure-sensitive adhesive, heatable support material was contacted on one side with a comblike conductor structure which was located on a PET support material, in analogy to FIG. 5, and on the other side was applied to a mirror surface. This construction was cooled to −20° C., then placed in a heating cabinet and heated. In the course of heating, the electrical resistance of the assembly was measured without current by means of an ohmmeter.

Preparation of Samples

Adhesive Component 1

A 200 L reactor conventional for free-radical polymerizations was charged with 24 kg of acrylamide, 64 kg of 2-ethylhexyl acrylate, 6.4 kg of N-isopropylacrylamide and 53.3 kg of acetone/isopropanol (85:15). After nitrogen gas had been passed through the reactor for 45 minutes with stirring the reactor was heated to 58° C. and 40 g of 2,2'-azoisobutyronitrile (AIBN) were added. Subsequently the external heating bath was heated to 75° C. and the reaction was carried out constantly at this external temperature. After a reaction time of 1 h a further 40 g of AIBN were added. After 5 h and 10 h dilution was carried out each time with 15 kg of acetone/isopropanol (85:15). After 6 h and 8 h, 100 g each time of dicyclohexyl peroxydicarbonate (Perkadox 16®, Akzo Nobel) in solution in each case in 800 g of acetone were added. The reaction was terminated after a reaction time of 24 h, and cooling took place to room temperature.

The determination of the molecular weight by Test A gave an $M_w$=341 000 g/mol with a polydispersity $M_w/M_n$=5.9.

Adhesive Component 2

A 200 L reactor conventional for free-radical polymerizations was charged with 12 kg of acrylamide, 74 kg of 2-ethylhexyl acrylate, 4.8 kg of N-isopropylacrylamide and 53.3 kg of acetone/isopropanol (87:13). After nitrogen gas had been passed through the reactor for 45 minutes with stirring the reactor was heated to 58° C. and 40 g of 2,2'-azoisobutyronitrile (AIBN) were added. Subsequently the external heating bath was heated to 75° C. and the reaction was carried out constantly at this external temperature. After a reaction time of 1 h a further 40 g of AIBN were added. After 5 h and 10 h dilution was carried out each time with 15 kg of acetone/isopropanol (87:13). After 6 h and 8 h, 100 g each time of dicyclohexyl peroxydicarbonate (Perkadox 16®, Akzo Nobel) in solution in each case in 800 g of acetone were added. The reaction was terminated after a reaction time of 24 h, and cooling took place to room temperature.

The determination of the molecular weight by Test A gave an $M_w$=408 000 g/mol with a polydispersity $M_w/M_n$=5.8.

EXAMPLE 1

Adhesive component 1 was blended in solution with 8% by weight of conductive carbon black (Printex XE, Degussa) and then coated using a coating bar onto a siliconized glassine release paper from Laufenberg. After drying at 120° C. for 10 minutes the thickness of the pressure-sensitive adhesive film was 50 µm.

This pressure-sensitive adhesive was subsequently crosslinked by irradiation with electrons. Irradiation with electrons was carried out using an instrument from Electron Crosslinking AB, Halmstad, Sweden. The coated pressure-sensitive adhesive tape was passed via a chill roll, which is present as standard, beneath the Lenard window of the accelerator. In the irradiation zone, the atmospheric oxygen was displaced by flushing with pure nitrogen. The belt speed was 10 m/min. The EB dose for example 1 was 50 kilograys, with an acceleration voltage of 180 kV.

EXAMPLE 2

Adhesive component 1 was blended in solution with 12% by weight of conductive carbon black (Printex XE, Degussa) and then coated using a coating bar onto a siliconized glassine release paper from Laufenberg. After drying at 120° C. for 10 minutes the thickness of the pressure-sensitive adhesive film was 50 µm.

This pressure-sensitive adhesive was subsequently crosslinked by irradiation with electrons as per example 1. The EB dose for example 2 was 50 kilograys, with an acceleration voltage of 180 kV.

EXAMPLE 3

Adhesive component 2 was blended in solution with 12% by weight of conductive carbon black (Printex XE, Degussa) and then coated using a coating bar onto a siliconized glassine release paper from Laufenberg. After drying at 120° C. for 10 minutes the thickness of the pressure-sensitive adhesive film was 50 µm.

This pressure-sensitive adhesive was subsequently crosslinked by irradiation with electrons as per example 1. The EB dose for example 3 was 50 kilograys, with an acceleration voltage of 180 kV.

EXAMPLE 4

Adhesive component 1 was blended in solution with 12% by weight of conductive carbon black (Printex XE, Degussa) and then coated using a coating bar onto a siliconized glassine release paper from Laufenberg. After drying at 120° C. for 10 minutes the thickness of the pressure-sensitive adhesive film was 50 µm.

This pressure-sensitive adhesive was subsequently crosslinked by irradiation with electrons as per example 1. The EB dose for example 4 was 30 kilograys, with an acceleration voltage of 180 kV.

EXAMPLE 5

Adhesive component 1 was blended in solution with 12% by weight of conductive carbon black (Printex XE, Degussa) and then coated using a coating bar onto a siliconized glassine release paper from Laufenberg. After drying at 120° C. for 10 minutes the thickness of the pressure-sensitive adhesive film was 50 µm.

This pressure-sensitive adhesive was subsequently crosslinked by irradiation with electrons as per example 1. The EB dose for example 5 was 80 kilograys, with an acceleration voltage of 180 kV.

EXAMPLE 6

An adhesive component was prepared in the same way as adhesive component 1, using a comonomer composition of 44.5% 2-ethylhexyl acrylate, 44.5% n-butyl acrylate, 8% methyl acrylate and 3% acrylic acid. The determination of the molecular weight by test A gave an $M_w$=650 000 g/mol with a polydispersity $M_w/M_n$=7.0. This adhesive component was blended in solution with 11.25% by weight of conductive carbon black (Printex XE, Degussa) and then coated using a coating bar onto a siliconized glassine release paper from Laufenberg. After drying at 120° C. for 10 minutes the thickness of the pressure-sensitive adhesive film was 100 µm. The pressure-sensitive adhesive was subsequently crosslinked by irradiation with electrons as per example 1. The EB dose was 60 kilograys, with an acceleration voltage of 180 kV.

Results

To determine the degree of crosslinking of the pressure-sensitive adhesives prepared according to examples 1 to 5 the gel index was ascertained following electron beam crosslinking by test D. The indices measured are listed in table 1.

TABLE 1

| Gel indices by test D. | |
| --- | --- |
| Example | Gel index in % (Test D) |
| 1 | 62 |
| 2 | 61 |
| 3 | 63 |
| 4 | 35 |
| 5 | 76 |

As expected, the sample of example 5, which was irradiated with the highest dose, exhibits the highest degree of crosslinking, and sample 4, which was irradiated with the lowest dose, has the lowest degree of crosslinking.

To determine the electrical heatability the planar structures of the invention were subjected to test B, the final temperatures being measured after application of a defined voltage. The results are shown in table 2.

TABLE 2

| Electrically induced temperatures by test B. | |
| --- | --- |
| Example | Temperature in ° C. (Test B) |
| 1 | 46 |
| 2 | 56 |
| 3 | 55 |

TABLE 2-continued

Electrically induced temperatures by test B.

| Example | Temperature in ° C. (Test B) |
|---------|------------------------------|
| 4 | 50 |
| 5 | 61 |

All of the examples exhibit a pronounced electrically induced heating behavior. A comparison of examples 1 and 2 demonstrates that with an increase in the degree of filling, in other words the mass fraction of the conductive carbon black in the samples, a more pronounced heating can be achieved. Example 3 demonstrates that even pressure-sensitive adhesives with different compositions in terms of the individual monomer fractions can be used. The samples of examples 4 and 5, which differ in the irradiation doses and hence in the degrees of crosslinking, display different heating behaviors. In particular it is apparent that a high degree of crosslinking (example 5) produces particularly advantageous heatabilities.

In conjunction with table 1 the temperature values measured for examples 2, 4, and 5 demonstrate the correlation between radiation dose, degree of crosslinking, and heatability. It is apparent that, as the dose goes up, there is an increase in the gel index and hence in the degree of crosslinking, and, as the degree of crosslinking goes up, the samples also exhibit an increase in heating temperature. Accordingly, the electrical heatability can be controlled on the one hand with increasing degree of filling of the electrically conducting filler material, and on the other hand by the degree of crosslinking as well.

Figure 8:
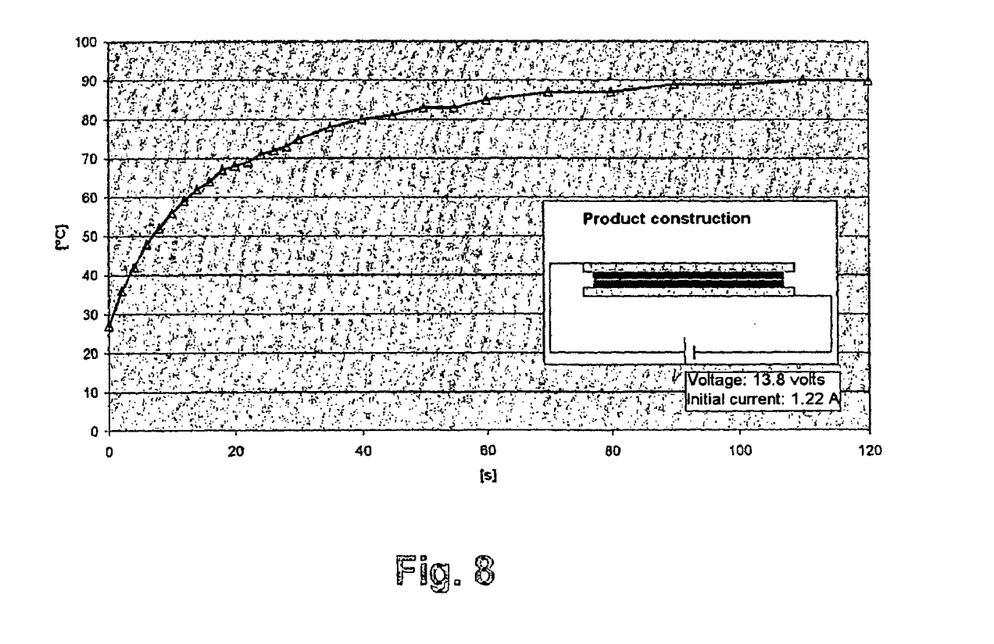
FIG. 8: Temperature limitation as a result of PTC effect

In order to demonstrate the PTC effect, temperatures were recorded by test B over a longer period of time than the 30 s specified in the test. FIG. 8 shows the heating plot for example 5, converging asymptotically to a limiting temperature of 90° C. [FIG. 8: temperature limitation as a result of PTC effect (example 5)].

The heatable support material in this example achieves an initial heat output of approximately 3 W/cm$^2$, which is calculated from the applied voltage, the initial current, and the surface area of the example specimen.

Figure 9:
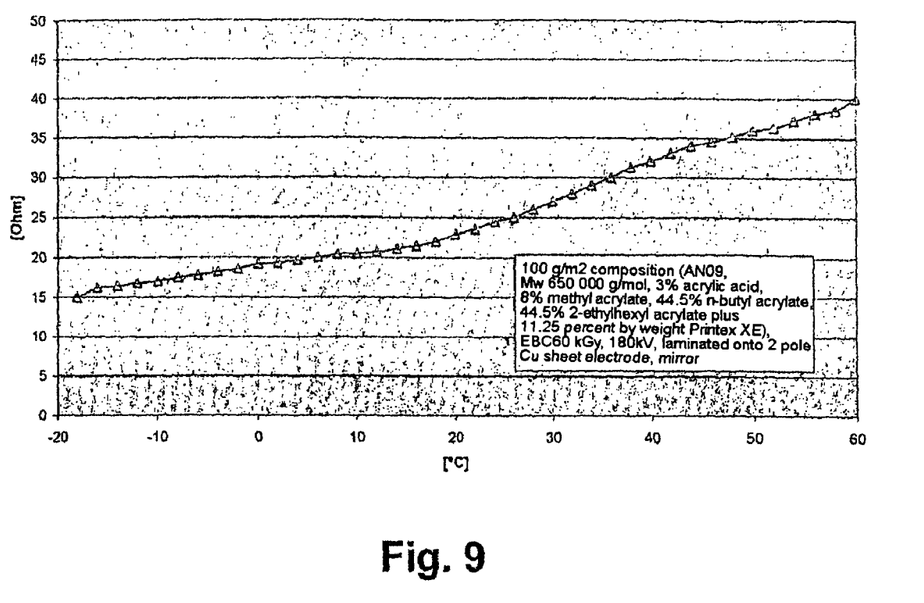
FIG. 9: Rise in resistance with increasing temperature

In addition the PTC effect was measured by means of a currentless measurement of the electrical resistance during the heating of a sample assembly (test E). FIG. 9 shows the rise in resistance with increasing temperature [FIG. 9: temperature/resistance plot, mirror heating, resistance measurement currentless by means of ohmmeter].

In order to demonstrate that the pressure-sensitive adhesives prepared in accordance with examples 1 to 5 above also exhibit good pressure-sensitive adhesion properties, the instantaneous bond strength to steel of all the samples was measured (see test C). The measurements are summarized in table 3.

TABLE 3

Instantaneous bond strengths to steel by test C.

| Example | Bond strength to steel (Test C) in [N/cm] |
|---------|-------------------------------------------|
| 1 | 3.6 |
| 2 | 3.4 |
| 3 | 3.2 |
| 4 | 4.2 |
| 5 | 2.8 |

The figures shown in table 3 make it clear that examples 1 to 5 possess good pressure-sensitive adhesion properties. The amounts of the added filler material, the monomer/comonomer composition, and the degree of crosslinking allow the bond strength to be controlled. High fractions of the filler material reduce the bond strength.

LIST OF REFERENCE NUMERALS

10 pressure-sensitive adhesive
12 metal foil
14 metal mesh
16 polymeric film
18 metal layer
20 electrode structure
22 further pressure-sensitive adhesive
24 release-coated support material

The invention claimed is:

1. A planar structure comprising at least one layer of a pressure-sensitive adhesive, said at least one layer of pressure-sensitive adhesive being adapted to originate heat within said at least one layer of the pressure-sensitive adhesive, said heat being originated by one or more of electrical current flow, induction, at least one chemical process and at least one physical phase transformation.

2. The planar structure of claim 1, wherein the at least one layer of the pressure-sensitive adhesive comprises:
    (a) at least one adhesive component; and
    (b) at least one electrically conductive filler material.

3. The planar structure of claim 2, wherein the electrically conductive material is graphite and/or carbon black.

4. The planar structure of claim 2, wherein the at least one filler material has a mass fraction of 2% to 20% by weight, based on the weight of the pressure-sensitive adhesive.

5. The planar structure of claim 1, wherein the at least one layer of the pressure-sensitive adhesive comprises:
    (a) at least one adhesive component and
    (b) at least one ferromagnetic, ferrimagnetic, superparamagnetic or piezoelectric filler material.

6. The planar structure of claim 5, wherein the at least one filler material is selected from the group consisting of quartz, tourmaline, barium titanate, lithium sulfate, potassium tartrate, sodium tartrate, potassium sodium tartrate, ethylenediamine tartrate, ferroelectrics with perovskite structure and lead zirconium titanate and/or from the group consisting of the metals aluminum, cobalt, iron, and nickel or their alloys and also from the group consisting of the metal oxides of the type n-maghemite ($\gamma$-Fe$_2$O$_3$), n-magnetite (Fe$_3$O$_4$) and/or the ferrites of the general formula MeFe$_2$O$_4$ where Me stands for divalent metals from the group manganese, copper, zinc, cobalt, nickel, magnesium, calcium or cadmium.

7. The planar structure of claim 5, wherein the at least one filler material has a mass fraction of 1% to 30% by weight, based on the weight of the pressure-sensitive adhesive.

8. The planar structure of claim 2, wherein the filler material in at least one spatial direction has an extent of not more than 500 nm.

9. The planar structure of claim 1, wherein the adhesive component is based on acrylic acid and/or methacrylic acid and/or based on esters of the aforementioned compounds or is based on natural rubber or synthetic rubber.

10. The planar structure of claim 1, wherein the adhesive component is based on partially crystalline polymers, or has partially crystalline polymers added thereto.

11. The planar structure of claim 1, further comprising at least one electrically conducting conduct selected from contacting means, the contacting means being actualized by a metal foil, a metal mesh, a metallized polymeric film and/or a metallization of the surface of the pressure-sensitive adhesive.

12. The planar structure of claim 1, further comprising at least one electrical or magnetic field generator.

13. The planar structure of claim 1, further comprising at least one layer of material which comprises at least one chemical substance which is capable of generating heat by means of an exothermic reaction.

14. The planar structure of claim 1, wherein the generation of heat can be limited by at least one inherent mechanism of the pressure-sensitive adhesive layer.

15. The planar structure of claim 1, wherein the at least one filler has a high heat capacity and/or the at least one layer of the pressure-sensitive adhesive comprises at least one further filler with a high heat capacity, selected from the group consisting of aluminum, beryllium, boron, calcium, iron, graphite, potassium, copper, magnesium, phosphorus or compounds of the aforementioned substances.

16. The planar structure of claim 1, further comprising at least one support sheet.

17. The planar structure of claim 1, further comprising at least one second layer of a pressure-sensitive adhesive.

18. The planar structure of claim 1, wherein the heatable planar structure is equipped with a mechanism which when the planar structure is first heated leads to an increase in the cohesion of the pressure-sensitive adhesive, heatable layer and/or of a further pressure-sensitive adhesive layer.

19. A method of heating a substrate, said method comprising the following steps:
 (a) adhering a planar structure according to claim 1 to a substrate; and
 (b) generating heat originating within the planar structure to heat the substrate.

20. The planar structure of claim 3, wherein the electrically conductive material is conductive carbon black.

21. The planar structure of claim 4, wherein the at least one filler material has a mass fraction of 5% to 12% by weight, based on the weight of the pressure-sensitive adhesive.

22. The planar structure of claim 7, wherein the at least one filler material has a mass fraction of 2% to 20% by weight, based on the weight of the pressure-sensitive adhesive.

23. The planar structure of claim 8, wherein the filler material in at least one spatial direction has an extent of not more than 50 nm.

24. The planar structure of claim 14, wherein the at least one inherent mechanism of the pressure-sensitive adhesive layer is the PTC effect or attainment of the Curie temperature.

25. The method of claim 19, wherein the heating of the substrate is induced by heating of the planar structure, the planar structure having been applied to a substrate which is equipped with at least one electrical contact or at least one means of generating an electrical or magnetic field or with at least one chemical substance which is capable of initiating an exothermic reaction within the planar structure, the substrate optionally being one of the bonded substrates itself.

* * * * *